United States Patent [19]

Nardin et al.

[11] Patent Number: 5,317,562
[45] Date of Patent: May 31, 1994

[54] METHOD AND APPARATUS FOR ROUTING CELL MESSAGES USING DELAY

[75] Inventors: Raffaele P. Nardin, Mountain View; Charles M. Corbalis, Milpitas, both of Calif.

[73] Assignee: Stratacom, Inc., San Jose, Calif.

[21] Appl. No.: 58,781

[22] Filed: May 7, 1993

Related U.S. Application Data

[63] Continuation of Ser. No. 663,256, Feb. 28, 1991, abandoned.

[51] Int. Cl.⁵ .............................................. H04L 12/56
[52] U.S. Cl. ................................... 370/16; 370/54; 370/60; 370/94.1
[58] Field of Search ................. 370/16.1, 54; 371/8.2, 371/11.2; 455/8; 340/827; 379/272, 273

[56] References Cited

U.S. PATENT DOCUMENTS

| | | | |
|---|---|---|---|
| 4,491,945 | 1/1985 | Turner | 370/60 |
| 4,494,230 | 1/1985 | Turner | 370/60 |
| 4,506,358 | 3/1985 | Montgomery | 370/94.2 |
| 4,703,475 | 10/1987 | Dretzka et al. | 370/60 |
| 4,771,424 | 9/1988 | Suzuki et al. | 370/60.1 |
| 4,771,425 | 9/1988 | Baran et al. | 370/94.1 |
| 4,819,228 | 4/1989 | Baran et al. | 370/85.1 |
| 4,825,206 | 4/1989 | Brice, Jr. et al. | 370/16 |
| 4,903,261 | 2/1990 | Baran et al. | 370/94.2 |
| 4,905,233 | 2/1990 | Cain et al. | 370/94.1 |
| 4,974,224 | 11/1990 | Boone | 370/94.1 |
| 5,088,032 | 2/1992 | Bosack | 370/94.1 |

OTHER PUBLICATIONS

IPX System Operation Guide by Stratacom (1988) pp. 1-1-1-2, 2-5-2-8, and 2-13-2-16.
PCT International Search Report Dated Jul. 10, 1992.

*Primary Examiner*—Douglas W. Olms
*Assistant Examiner*—Hassan Kizou
*Attorney, Agent, or Firm*—Blakely, Sokoloff, Taylor & Zafman

[57] ABSTRACT

A method and apparatus for use in a cell network node for initial routing and rerouting of connections to a slave node based on ordering candidate slave connections, searching existing connections for candidate best routes and validating the selected best route comparing actual route delays and available bandwidth with maximum allowable delays and loading of the candidate slave connection. The invention also provides for programmable queuing delays by controlling queue lengths and for improved justification of reassembled information using actual maximum node delays.

7 Claims, 10 Drawing Sheets

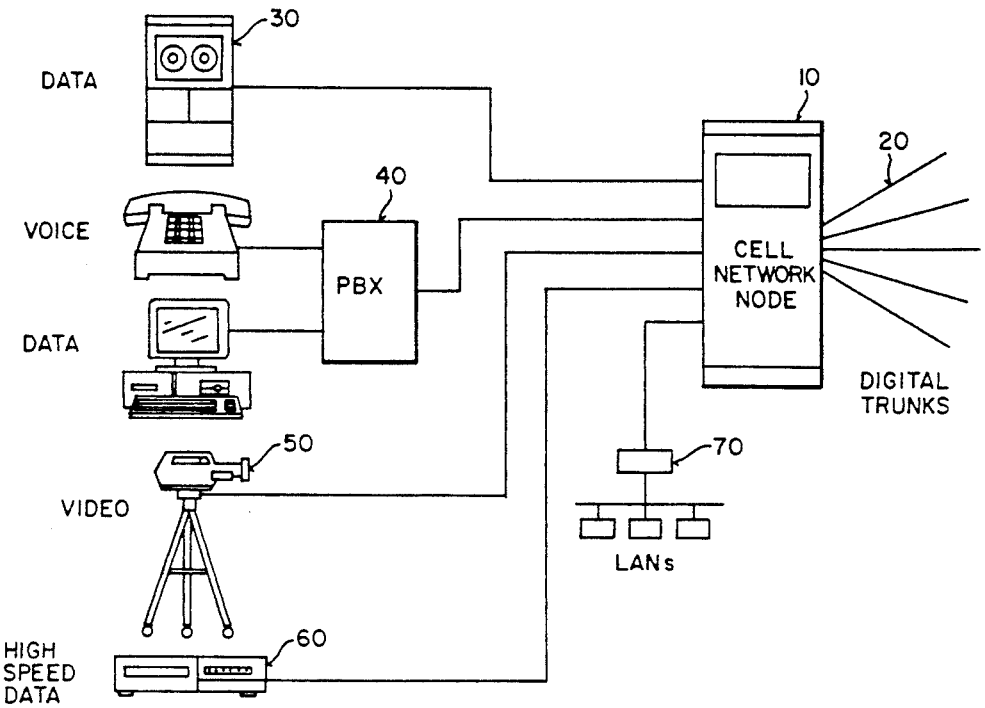
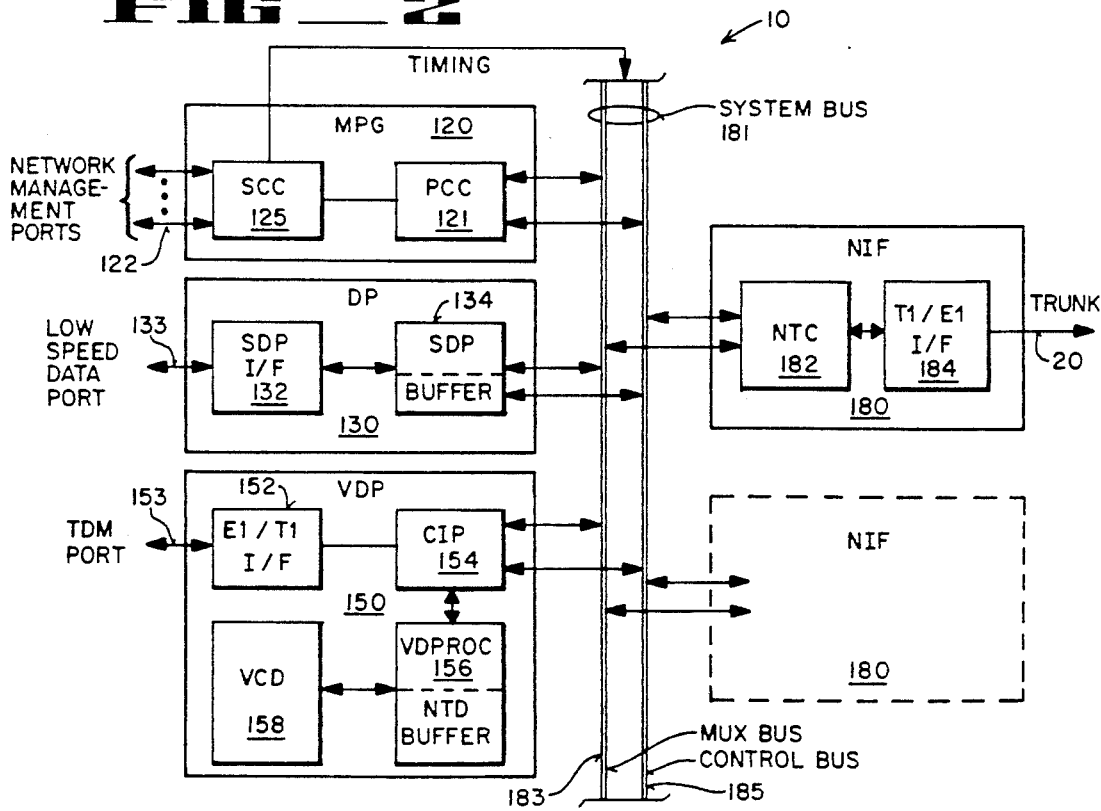

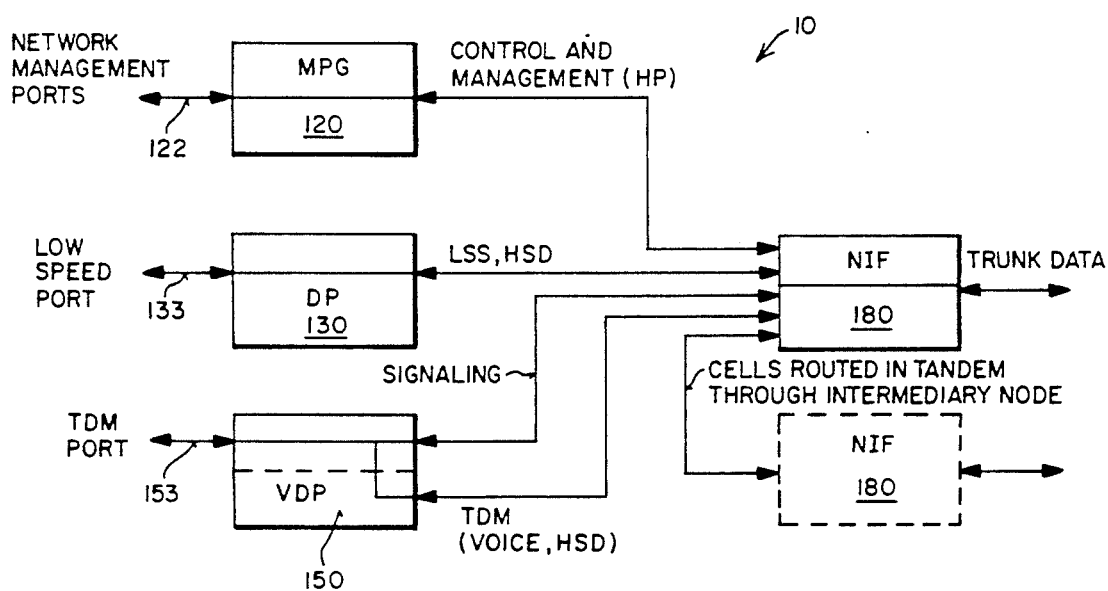
FIG_3

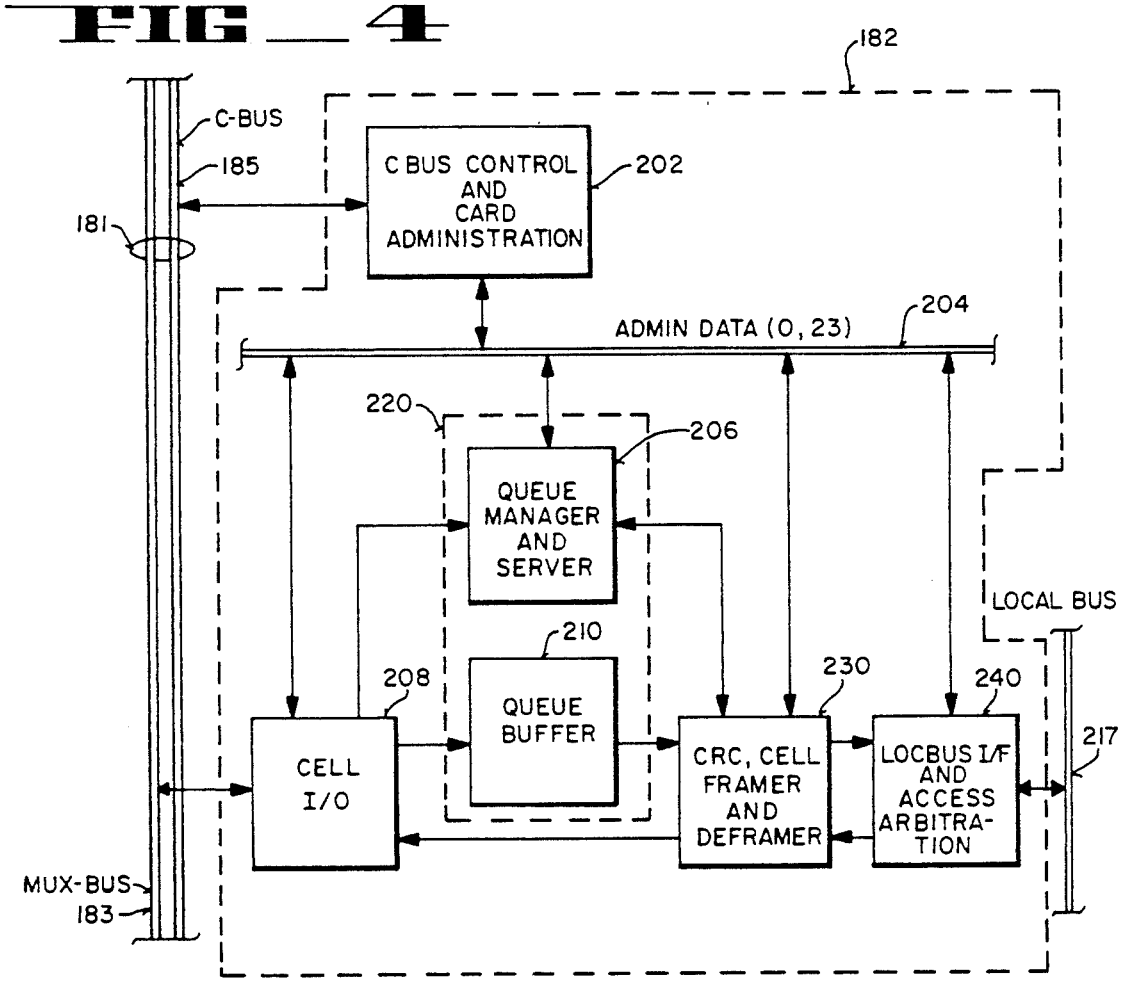

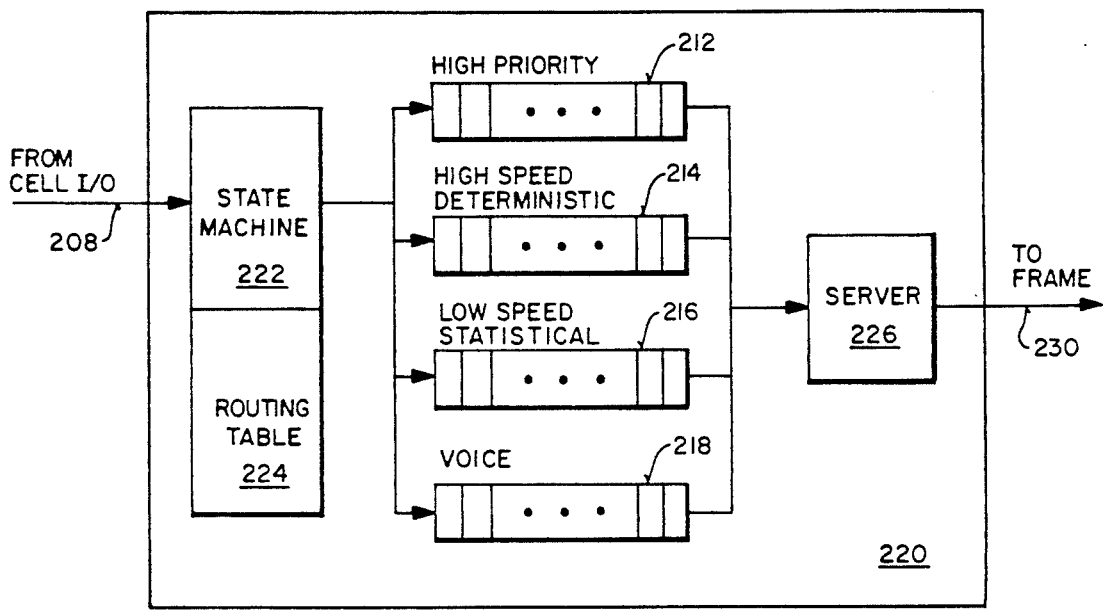
FIG_5
FIG_6
| TRUNK Bw (Kb/s) | | QUEUEING DELAY HSD | QUEUE SIZE HSD | QUEUEING DELAY VOICE | QUEUE SIZE BOUNDARY |
|---|---|---|---|---|---|
| 256 | (4 DS-0) | 3.75 | 5 | 2.5 | 4 |
| 384 | (6 DS-0) | 3.50 | 7 | 2.5 | 5 |
| 448 | (7 DS-0) | 3.43 | 8 | 2.5 | 6 |
| 512 | (8 DS-0) | 3.75 | 10 | 2.5 | 7 |
| 768 | (12 DS-0) | 3.75 | 15 | 2.5 | 10 |
| 896 | (14 DS-0) | 3.65 | 17 | 2.5 | 11 |
| 960 | (15 DS-0) | 3.60 | 18 | 2.5 | 12 |
| 1024 | (16 DS-0) | 3.75 | 20 | 2.5 | 14 |
| 1344 | (21 DS-0) | 3.71 | 26 | 2.5 | 17 |
| 1544 | (24 DS-0) | 3.75 | 30 | 2.5 | 20 |
| 1920 | (30 DS-0) | 3.80 | 38 | 2.5 | 25 |
| 2048 | (32 DS-0) | 3.80 | 38 | 2.5 | 27 |

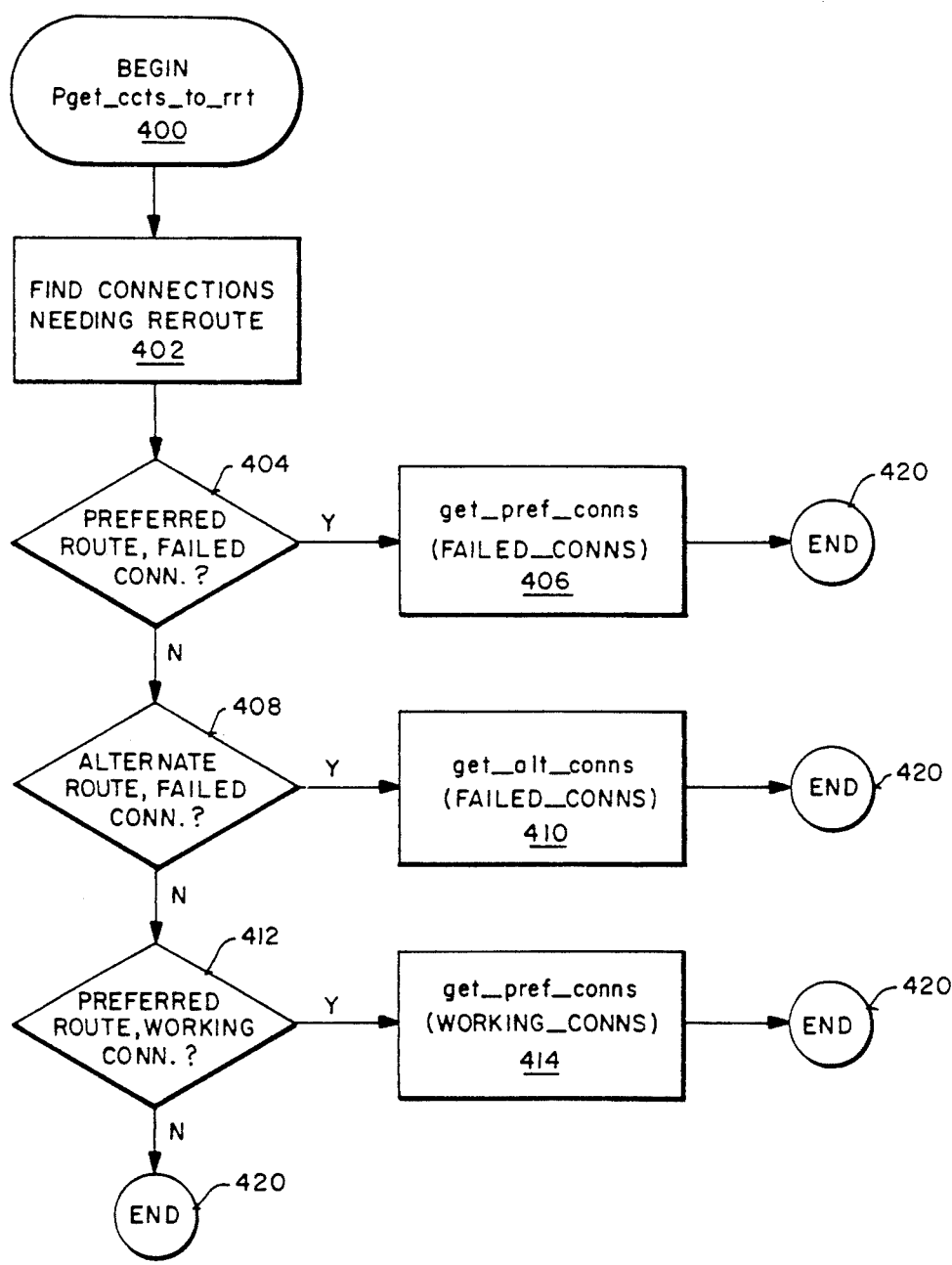

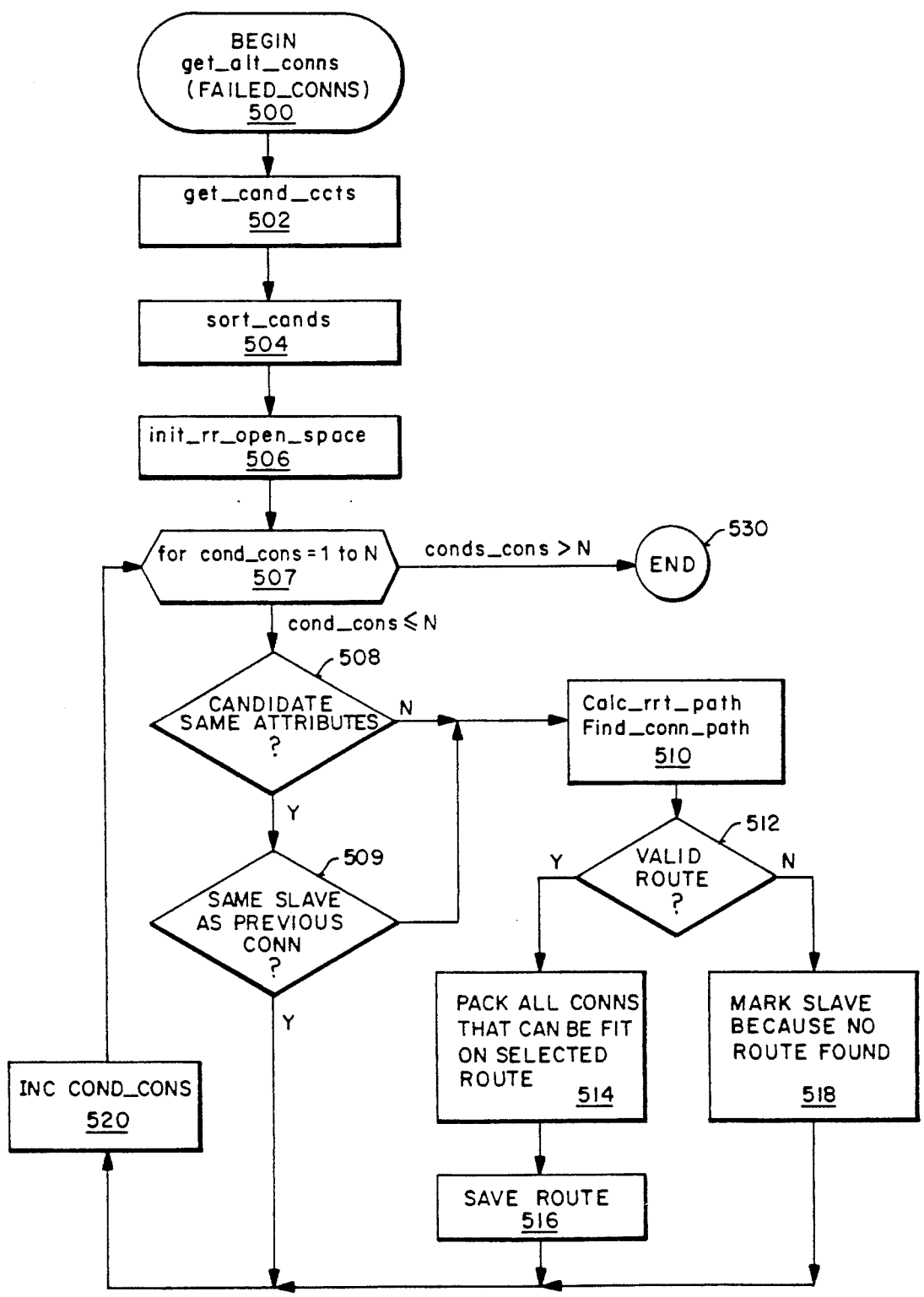

FIG_9

| CONNECTION TYPE | UTILIZATION | LOAD CELLS/SEC. |
|---|---|---|
| TRANSPARENT PCM | 1.0 | 381 |
| ADPCM | 1.0 | 191 |
| VAD VOICE | 0.4 | 153 |
| COMPRESSED VOICE | 0.4 | 77 |

FIG_10A
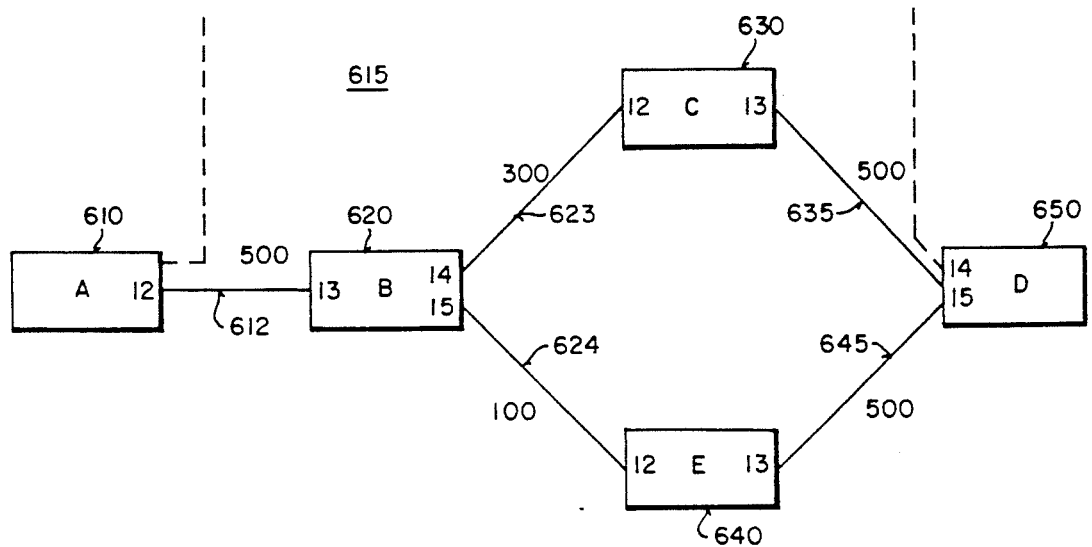
FIG_10B
| NODE | HOPS | CELL LINE |
|------|------|-----------|
| A | 0 | 0 |
| B | 1 | 13 |
| C | 2 | 12 |
| D | 3 | 14 |
| E | 2 | 12 |
BEST ROUTE TABLE BUILT BY FIND_CONN_PATH RUNNING AT NODE A TO REROUTE A CONNECTION FROM A (MASTER TO D (SLAVE).

CHECKING DELAY ON A ROUTE:
FLOW CHART FOR IS_PATH_DELAY_OK

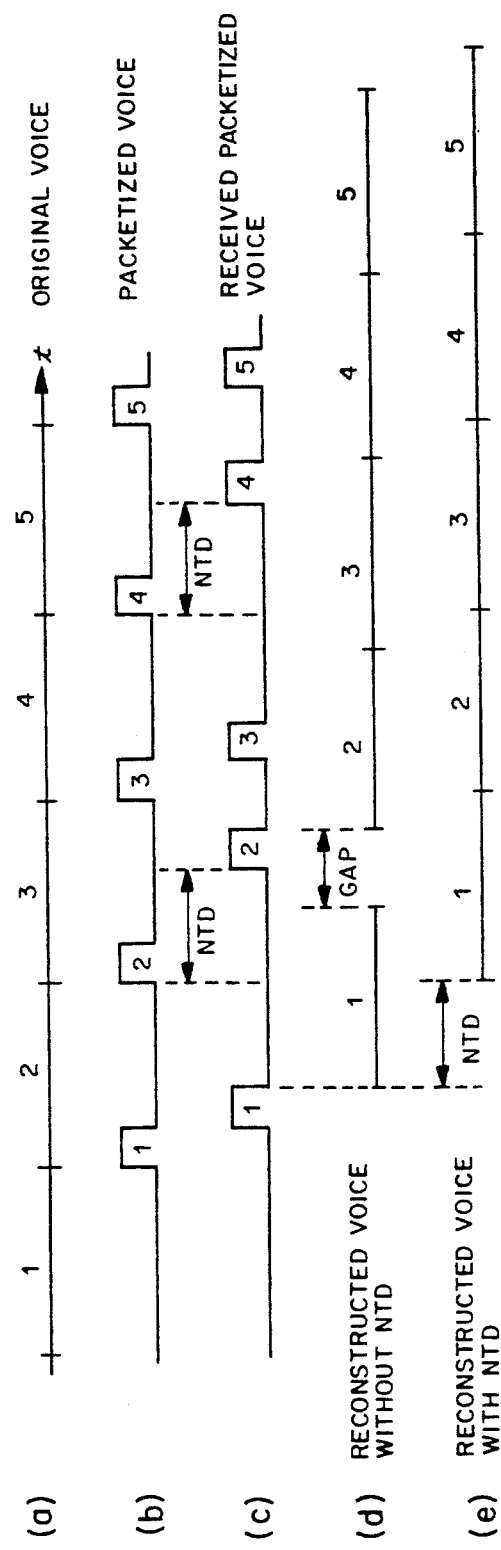

METHOD AND APPARATUS FOR ROUTING CELL MESSAGES USING DELAY

This continuation of application Ser. No. 07/663,256, filed Feb. 28, 1991, now abandoned.

FIELD OF THE INVENTION

The present invention relates to the field of cell switching network communications. More particularly, this invention relates to a method and apparatus for managing the selection of routes in cell switching networks based upon network node queuing and packetization/depacketization delays.

BACKGROUND OF THE INVENTION

Prior cell switching networks typically allow integration of voice, data, facsimile, and video signals over a network, permitting the interconnection of computers, private branch exchanges ("PBXs"), and other communications equipment using a single type of switching fabric. Cell switching networks are also referred to as communication networks for fixed length packets. This prior cell technology is also known as Cell Relay by the Institute of Electrical and Electronic Engineers ("IEEE") and as Asynchronous Transfer Made ("ATM") by the International Telegraph and Telephone Consultative Committee ("CCITT").

Cell switches typically operate in private corporate networks. Private high speed digital networks have expanded relatively rapidly in the United States due to the ready availability of T1 trunks and in Europe due to the ready availability of E1 trunks. A typical international network may use a mixture of (1) T1 trunks in North America and Japan and (2) E1 trunks in Europe. Gateway nodes provide the necessary conversions between the two standards.

Unlike prior circuit switching communication networks that commit specific communication resources to a given end-to-end connection, prior cell switching networks typically establish virtual connections. This means that network resources are generally only used when needed. This allows for optimal use of network resources (bandwidth) based on the existing demands and priorities. This contrasts with dedicated physical routing that does not take into consideration varying demand and priorities.

Each cell switching node of a prior cell switching network typically permits a user to enter a message longer than the specified maximum cell size. The longer message is typically segmented and formatted into multiple cells along with "housekeeping" information presented by the network protocol. The individual cells are reassembled at the destination node. Typically there is reduced transit delay because of pipelining and reduced average queuing and packetization delay at each node because of short cell formats.

A prior North American or Japanese T1 trunk typically has a data rate of 1.544 megabits per second ("Mbps"). A prior European E1 trunk typically has a data rate of 2.048 Mbps. Prior fractional T1 trunks allow operation at integral multiples of 64 kilobits per second ("Kbps"), which is a digital signal zero "DS0" unit of bandwidth corresponding to the rate required for a single voice channel. This helps to avoid the full cost of a T1 trunk. This service is available in the U.S. and Canada. A similar European trunk service, known as X.21, supports data rates from 256 Kbps to 1.920 Mbps in units of 64 Kbps on unframed E1 lines.

The incorporation of fractional trunks into a prior cell network typically generates longer queuing delays at the nodes of these trunks. For a fixed queue length, queuing delay is inversely proportional to the trunk data rate. These delays may introduce restrictions on certain uses of these trunks. Voice communications are typically drastically hindered by excessive end-to-end delays. The management of these delays in a cell network is often critical.

Another complication resulting from the incorporation of fractional trunks into a prior cell network is that varying delays may result from dynamic route selection when there are links of differing capacities and queuing delays.

SUMMARY AND OBJECTS OF THE INVENTION

One of the objects of the present invention is to provide a method and apparatus for adaptively selecting routes based on actual maximum delay of each link of the route.

Another object of the present invention is to provide a method and apparatus for configuring maximum route delays by user adjustable queue lengths.

Another object of the invention is to provide a method for route selection based on both the number of hops and available bandwidth.

Another object of this invention is to provide an improved method and apparatus for properly playing out received calls that have experienced dynamically variable delays so as to ensure uniformly sampled reconstructed voice signals at the destination by using actual user configurable delays.

Yet another object of the invention is to provide a method and apparatus for automatically updating tables of validated routes.

A method for use by a cell network master node for the rerouting of failed connections to a slave node is described. Candidate slave connections needing to be rerouted are ordered according to their respective loading. Existing connections are searched for a candidate best route between the master and the slave node. If the total candidate actual route delay is within user configurable prescribed limits and if it has sufficient bandwidth to accommodate the candidate slave connection, the route is validated and its description updated to reflect the additionally packed slave connection. These operations are repeated until all candidate slave connections have been processed.

A method and apparatus is also described that provides for: (1) specification of criteria for maximum allowable end-to-end delay for each type of data; (2) user configurable variable queue lengths; (3) means for calculating total delays over alternative routes and validating those routes satisfying maximum delay criteria; and (4) means for properly delaying reassembled information based on the route delay.

Other objects, features, and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which:

FIG. 1 is a functional block diagram of a cell switching network node and its local environment.

FIG. 2 is a more detailed functional block diagram of a cell switching network node.

FIG. 3 is a signal flow diagram of a typical cell switching network node.

FIG. 4 is a detailed block diagram of a Network Trunk Card ("NTC").

FIG. 5 is a signal flow block diagram of the NTC queue buffer unit and queue manager and server unit.

FIG. 6 is a table depicting the relationship between trunk bandwidth (cells/second) and queue delay and size for HSD and voice connections.

FIG. 7 is a flow chart that describes the primitive routine Pget_ccts_to_rrt for selecting a set of connections to reroute.

FIG. 8 is a flow chart of the get_alt_conns routine use in rerouting.

FIG. 9 is a table showing the utilization factor and load for various connections.

FIG. 10A is an example of a network.

FIG. 10B is an example of a best route table.

FIG. 12 is a table relating connection type to queue delay and maximum allowable delay.

FIG. 13 shows the use of NTD correction in reassembly and reconstruction of voice data.

DETAILED DESCRIPTION

Figure 11:
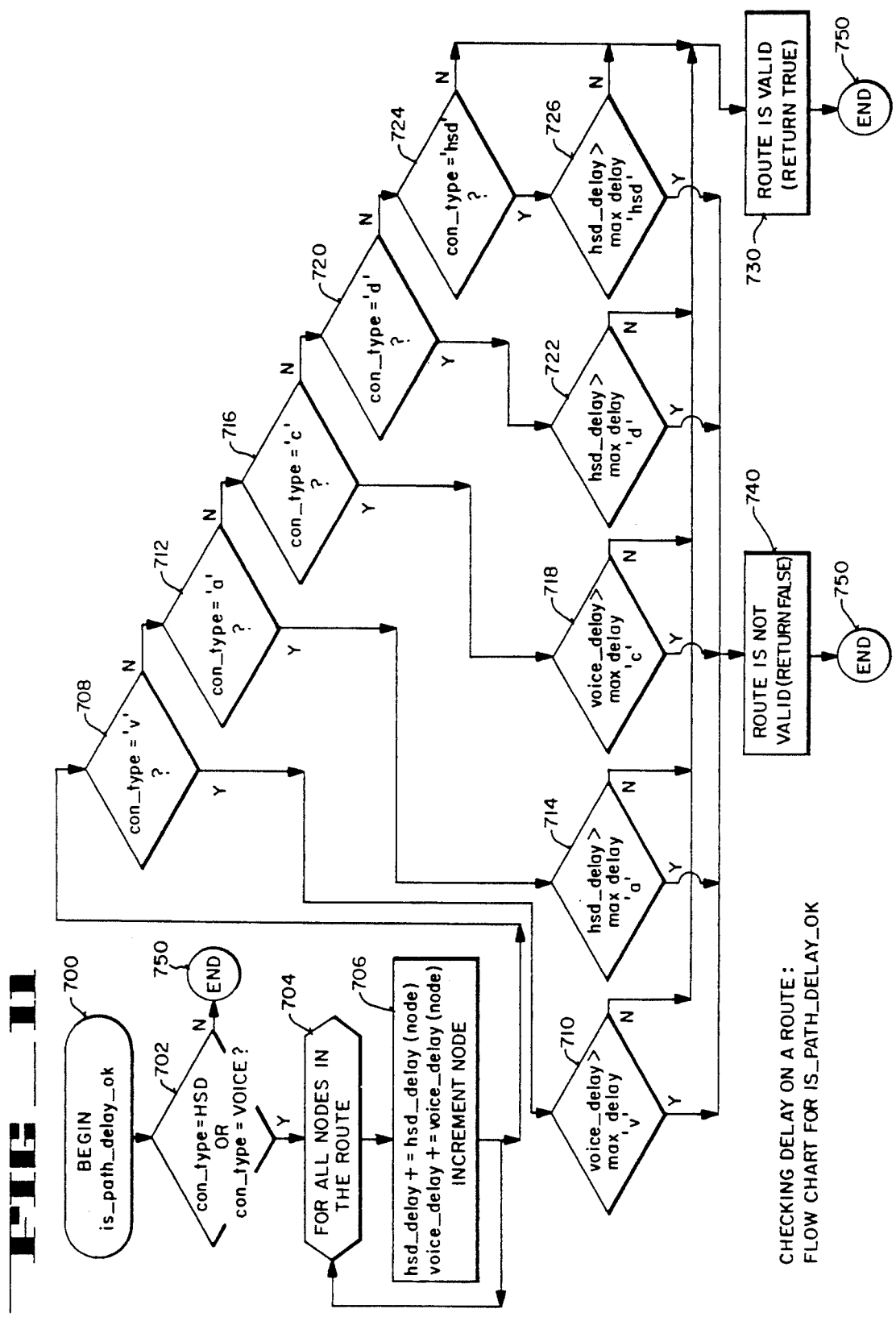
FIG. 11 is a flow chart of routine is_path_delay_ok used for checking path delay.

FIG. 1 illustrates a portion of a cell switching communication system. The cell switching communication system comprises a number of nodes that interconnect standard digital trunks, usually of the T1 or E1 type. As described in more detail below, a method and apparatus are provided for selecting routes in the cell switching communication system. A preferred embodiment of the invention is centered in each cell network node.

FIG. 1 shows cell node unit 10 of a cell switching network that incorporates a preferred embodiment of the present invention. Cell node 10 couples a plurality of digital trunks 20 to local devices that can be sources or destinations for information. For the example shown in FIG. 1, the local devices are data processing equipment 30, PBX terminal 40, video data source 50, high speed modem 60, and local area network (LAN) terminals 70. Unit 10 is a programmable unit that provides message formatting and interfacing between the local environment (comprising devices 30, 40, 50, and 60) and network trunks 20. Node 10 also provides system wide control functions.

FIG. 2 is a functional block diagram of unit 10. A system bus 181 handles data and control information. System bus 181 is made up of two buses: (1) MUXBUS 183, which is a high speed data bus for switching cells, and (2) C-BUS 185, which is a control bus for configuring, managing, and monitoring unit 10 boards. C-bus 185 is also referred to as control bus 185.

Common control functions are provided by the management processor group ("MPG") 120, which includes processor control card ("PCC") 121 and system clock card ("SCC") 125. PCC 121 provides for the distributed system management of the cell network. PCC 121 uses a 68000 16 bit microprocessor manufactured by Motorola, Inc. of Schaumburg, Ill. as its basic processing unit. Model 80C31 uses a bus controller manufactured by Intel Corp. of Santa Clara, Calif. as a C-Bus controller. The 68000 central processing unit ("CPU") contains the software in 2 Megabytes of flash EPROM and 8 Mbytes of DRAM for controlling, diagnosing, and monitoring unit 10. The 68000 microprocessor of PCC 121 also contains network configuration databases for route management.

PCC 121 distributes control and configuration information on the C-BUS 185 of system bus 181 to individual card groups resident in node 10, each of which is coupled to the C-BUS by an 80C31 controller. PCC 121 is microprocessor controlled for independent operation. All network PCC 121 cards cooperate to perform network-wide functions.

System Clock Card ("SCC") 125 provides a centralized clock generation function for node 10. SCC 125 produces the system clock and the trunk synchronizing clocks. It also includes network management ports 122 for the connection of terminals and workstations for accessing and controlling cell unit 10 via PCC 121.

The data PAD ("DO") group 130 includes an interface card 132 for coupling node 10 to slow speed RS-232, RS-449, V.35, and X.21 data sources through port 133. The acronym "PAD" refers to the function of packet assembly and disassembly. For a preferred embodiment of the present invention, each packet being assembled and disassembled is a fixed length packet. A fixed length packet is also referred to as a cell.

DP group 130 also includes a synchronous data PAD ("SDP") card 134 for buffering, assembly, and formatting low speed statistical (LSS) and high speed deterministic (HSD) data for bit-for-bit transmission (transparent operation) the network cells are transmitted to and received from system bus 181.

The voice data PAD unit ("VDP") 150 is coupled between the time division multiplex ("TDM") port 153 and the system bus 181. Pulse code modulation ("PCM") voice data, for example, from an E1 line (and originating from PBX unit 40 of FIG. 1) with a time division multiplexed data rate of 2.048 Mbps is coupled by the E1/T1 interface 152 to the channel interface port ("CIP") card 154. Back card 152 multiplexes TDM data on the trunk when acting as a sending source and demultiplexes TDM data when receiving data from the trunk.

CIP card 154 strips telephone signaling information from the incoming TDM stream, converts this into cells, and then transmits the cells onto system bus 181. CIP card 154 also receives signaling cells from system bus 181 and reconstructs the signaling information, which is then inserted into the outgoing TDM stream. CIP card 154 demultiplexes the TDM data portion and then transmits the resulting information as individual channels to the voice data processor ("VDPROC") 156. Likewise, CIP card 154 receives channels of information from VDPROC 156 and multiplexes the channels of information into a data stream. The TDM data can comprise voice data or high speed deterministic ("HDS") data.

A voice processing subgroup of VDP 150 consists of voice data processor card 156 and voice compression/decompression (VCD) card 170. VDPROC 156 acts as a server to one or more CIP 154 units, building separate cells for each time division multiplexed 64 Kbps (DS0) channel served. VDPROC 156 also provides selectable voice data rate compression by detecting intervals of silence and causing inhibition of cell transmissions, known as voice activity detection ("VAD"), during silent intervals. Because the TDM port 153 may also include modem and facsimile (i.e., high speed deterministic) data, VDP 156 detects the presence of such DS0 channels and inhibits VAD rating on voice data, selectively applies compression techniques to standard 64 Kbps PCM voice data and produces 32 Kbps compressed voice data using the industry standard CCITT G.721 adaptive differential PCM ("ADPCM") algorithm. VAD in combination with ADPCM can provide more than a 4 to 1 compression in voice data rates.

Network trunk card ("NTC") 182 and interface ("I/F") 184 make up a trunk network interface group ("NIF") 180 that couples data from MUXBUS 183 portion of system bus 181 to a cell network trunk 20. NTC 182 is a multiprocessor platform that can be programmed through PCC 121 to implement a variety of features. NTC 182 has a throughput rate up to 2.048 Mbps. NTC 182 receives cells addressed to it from MUXBUS 183 of system bus 181. NTC 182 queues the cells in separate queues based on traffic type. NTC 182 performs network cell framing and deframing. NTC 182 also performs the physical layer convergence function for putting cells onto a physical trunk and queues the data for transmission via T1/E1 trunk interface 184. Interface card 184 arbitrates access to network trunks. Interface card 154 handles various grades of information, including: (1) voice data, (2) control and signaling data, (3) high speed deterministic video data, (4) low speed statistical (LSS) terminal data and (5) TDM data. The TDM data can comprise voice data or HSD data.

Although the preceding description of node 10 has been limited to discussing its use in collecting and concentrating data from data sources associated with its immediate environment and processing the input data for cell transmission over the cell network, it should be kept in mind that each node 10 is a bidirectional system capable of transmitting as well as receiving data in a fashion analogous to a common telephone system. In other words, referring to FIG. 2, trunk 20 may be the source of data coupled to T1/E1 interface 184. Interface 184 then passes selected data to NTC 182 and thence onto the system bus 181 for reverse flow into the designated bidirectional units. When interconnected in a cell network, two connected nodes 10 operate in a mirror symmetric mode—while one unit is performing a sending function, the other is performing the matching receiving function. FIG. 3 summarizes the major bidirectional signal flow paths through a typical cell switching node 10.

FIG. 4 illustrates network trunk card 182 coupled to system bus 181. NTC 182 is a bidirectional multiprocessor unit that is coupled to (1) one or more network trunks through the E1/T1 interface unit 184 on one side and to (2) the System Bus 181 on the other side. As shown in FIG. 4, System Bus 181 is made up of two buses: C-BUS 185 and MUXBUS 183. C-BUS 185 provides the means for PCC 121 of FIG. 2 to configure and communicate with NTC 182 through C-BUS Control and Card Administration (CCA) unit 202, CCA unit 202 is a multiprocessor card that includes an Intel Corporation 80C31 processor coupled to C-BUS 185 and a Motorola, Inc. 68008 16 bit microprocessor coupled to ADMINDATA-BUS 204.

MUXBUS 183 is both a source and destination of cells for NTC 182 by cell I/O unit 208. In the transmit mode, cell I/O unit 208 delivers cells from MUXBUS 183 to Queue buffer 210. Queue buffer 210 is a memory structure containing four distinct buffer memories for four classes of data: (1) High Priority ("HP"), (2) High Speed Deterministic ("HSD"), (3) Low Speed Statistical ("LSS"), and (4) Voice.

The NTC buffering and queue serving functions are performed by unit 220. Unit 220 is comprised of (1) queue manager and server ("QMS") unit 206 and (2) queue buffer 210. QMS unit 206 controls the buffer selection and queue length functions of queue buffer 210 in accordance with configuration parameters provided via the 24 bit ADMINDATA-bus 204. In one preferred embodiment, QMS unit 206 and queue buffer 210 are physically implemented by means of two 56000 digital signal processor ("DSP") chips manufactured by Motorola, Inc.

FIG. 5 shows the functional cell signal flow through unit 220. Cells received from I/O unit 208 are routed to their destination by state machine 222 in accordance with its associated routing table 224. Routing table 224 contains a map of cell addresses that are to be received by this card. The routed cell information is directed to one of four buffers—HP212, HSD 214, LSS 216, and Voice 218—in accordance with the cell information included in the cell. Server 226 also supervises overall priorities between the four buffers. HP 212, containing the highest priority data relating to system operation and control, is granted the highest priority by server 226. Remaining queues are serviced so as to guarantee minimum bandwidth availability to each data type.

The output of QMS 206 is provided by server means 226 to Cell Framer/Deframer unit 230 of FIG. 4. Cell framer/deframer unit 230 which calculates the cyclic redundancy check ("CRC") for cell header error control and formats the cells into suitable frames for transmission on E1 or T1 trunks. QMS 206 is coupled to an internal local bus 217 by unit 240. Unit 240 arbitrates access to local bus 217 and to an appropriate E1/T1 184 cell trunk interface card which is also coupled to local bus 217.

NTC 182 of FIG. 4 is bidirectional. When NTC 182 is operating in a receiving mode, data received from E1/T1 interface unit 184 of FIG. 2 is passed on via local bus 217 to I/F unit 240. I/F unit 240 in turn passes the data to cell framer/deframer 230, which checks the frame CRC bytes and rejects any frames found to be in error. If not rejected, the cell is passed onto MUXBUS 183 via Cell I/O unit 208.

Returning to FIG. 5, high priority ("HP") traffic consists of PCC-to-PCC control messages, which typically comprise a small portion of the network trunk data capacity (bandwidth). In order to prevent a lock-up situation, this traffic is given the highest priority so that failures and overloads can be quickly remedied by the system software. This class of traffic is routed through FIFO queue HP 212.

Voice traffic consists of PCM or adaptive differential PCM ("ADPCM") voice information employing the voice activity detection feature of the system. The NTC server 226 of FIG. 5 assumes that this traffic has sufficient statistical redundancy so that up to 1% of the voice cells may be discarded during periods of trunk congestion without severe loss of intelligibility. Voice traffic is routed through timed first-in first-out ("FIFO") queue 218. Voice cells are served in normal FIFO order. If, however, the voice cells have aged in the queue more than the parameter MAX VOICE AGE permits (which has a 2.5 millisecond default value), they are discarded by server 226.

HSD traffic consists of high-speed, full-period PCM data or data from FDP 130 of rates greater than 64 Kbps. Because no assumption about statistical redundancy may be safely made concerning full period data, server 226 must ensure, by its servicing strategy, that sufficient trunk capacity is made available to support this data without the loss (discard) of any data. This data is held in HSD Queue 214.

Low speed statistical data (LSS) originates from the data group DP 130 of FIG. 2 or from signaling information originating from CIP 154. LSS data originating from FDP 130, operating at rates less than 64 Kbps, includes repetitive pattern suppression compressed data as well as full-period deterministic traffic which is time-stamped and routed through oldest first queue LSS 216. A byte in the cell header is used to keep track of the queuing delay experienced by the cell as it makes its way through the network. Cells exceeding the specified maximum delay are discarded by NTC 182.

HP traffic is very burst-like and its traffic load, independent of the trunk data capacity, is often in the range of 50 to 150 cells per second. Virtual terminal sessions and voice connection signaling updates cause the highest spurts of HP traffic. HP peak traffic requires a relatively high percentage of data capacity of trunks with small aggregate bandwidth. High peak traffic demands of HP data may induce cell drops on the connection traffic.

The undesirable impact of HP traffic loads may be minimized by queue sizing, by proper route selection, and by providing a statistical trunk capacity reserve that allows for unexpected peak loads. In practice, a statistical reserve of 600 cells per second is generally adequate. Queue sizing and route selection strategies are discussed in more detail below.

The aforementioned strategies, however, do not address the undesirable effects of the statistically variable queuing delays introduced by the bursty nature of HP traffic. The deliberate use of a precalculated delay of the receiving node to compensate for these effects is discussed in more detail below.

The queuing delays on the HSD queue 214 and the voice queue 218 become important in the case of fractional rate trunks. These small aggregate bandwidth (data rate) trunks can cause large queuing delays unless queue sizes are properly controlled. The default values for HSD queue 214 and voice queue 218 are set at trunk configuration time as determined from the aggregate bandwidth of each trunk.

The default values for HSD queue sizes are calculated not to exceed a 3.75 ms queuing delay from the following formula, wherein a cell is assumed to be a 24 byte cell:

Max HSD Queue Size=(Max Delay)*(Trunk rate in bytes/sec)*(1 cell/24 bytes)

Because the trunk rate comes in 8000 bytes/second, the DS0 trunk rate may be expressed as 8000N, wherein N is the number of DS0 units. Substituting in the above expression yields Max HSD Queue Size=$(3.75 \times 10^{-3})*(8 \times 10^3 \times N)*(1/24)=1.25N$ the integer part of which expresses the queue size in cell units as listed, for example, below in Table 1.

TABLE 1

| N | 4 | 5 | 6 | 7 | ...10 | ...15 | ...32 | DS0s |
|---|---|---|---|---|---|---|---|---|
| HSD Queue Size | 5 | 6 | 7 | 8 | ...12 | ...18 | ...40 | Cells |

In the case of the voice queue, the queuing delay is the minimum of the maximum voice age parameter and the delay calculated by multiplying the voice queue size by the cell service time. In the default case, the maximum voice age parameter is 2.5 ms and the voice queue size is set at 100 cells. Hence, unlike the HSD case, for all the supported trunk aggregate bandwidths, the queuing delay equals the Maximum Voice Age parameter value in the default case. These relationships are summarized in FIG. 6.

When a trunk is added to the network, both the HSD and voice queuing delays are distributed (i.e., broadcast) to all the nodes along with the trunk line attributes that form the network topology (i.e., line type, capacity and statistical reserve). System software handles the broadcasting of the network topology to all the nodes in the network, including queuing delays. Queuing delays are used by the rerouting software to validate the routes used by the connection traffic, as described below.

Both the HSD and voice queue size may be configured by the user. When the HSD queue size is modified, the user interface routine recalculates the queuing delay. If the change resulted in an increased delay, all connections routed on that line are rerouted. The new queuing delay is also broadcast when user reconfiguration results in a smaller delay.

When the remaining nodes receive the broadcasted user update message, the new queuing delay is integrated into the topology information for the specific node. It is important to note that the software automatically updates the queuing delay and the specific queue size at the remote end of the cell line. This helps to ensure that the queuing delay is maintained as bidirectional information in the network topology. Conflicting values between queuing delays are resolved to the lower value.

Five system wide parameters are used in a preferred embodiment of the invention to manage connections using HSD and voice queues. The parameters specify the maximum network delay on a route for the following connection types: ADPCM, Transparent PCM, Voice, Compressed Voice, and High Speed Data.

To determine if a connection can use the route, connection management software adds up the various queuing delays on a route and compares it to the specific applicable maximum network delay. If the route is validated, the calculated delay is used to program the Null Timing Delay on the connection PAD, as described in more detail below.

Because adaptive voice compression can be dynamically enabled or disabled as required by bandwidth availability considerations, the cell is directed to the appropriate queue: voice queue 218 when enabled and HSD queue 214 when disabled. In the latter case, the connection is upgraded and, hence, requires the route to be revalidated.

Automatic rerouting is performed by a state machine called Cm_Rrt that is part of the transaction handler process of the software residing on PCC card 120. Under normal operation, the state table will "rekick" (restart) itself periodically—every, 15 seconds, for example—with a timeout event, unless kicked-off by another event such as (1) enabling/disabling adaptive voice compression, (2) line failures, (3) line repairs, (4) network topological changes, or configuration of preferred routes.

Once kicked-off, the state table determines if any connections should be rerouted. If a set of owned connections requires rerouting, or initial routing is required, and if the set can be rerouted over a common route, the connections are first derouted, i.e., put in a state having no route with only endpoints defined. Upon establishing a new route, this information is disseminated on the network to inform the nodes that the connections are rerouted. The state table re-kicks itself to reroute any additional connections, not included in the prior set, until all connections owned by the node requiring and capable of rerouting are serviced.

Thus, the process of automatic rerouting involves the process of derouting the connections. When a connection fails, due to path or endpoint failure, it is derouted before rerouting.

FIG. 7 is a flow chart that describes the primitive routine Pget_ccts_to_rrt 400 used by one of the state machines Cm_Rrt of the above mentioned PCC 120 for selecting a set of connections to reroute. The routine is entered as a result of a kick-off event requiring a reroute of connections of which it is "master."

The source node is "master". The other endpoint node is "slave." "Via" nodes are nodes on the route from master to slave.

Connections to be rerouted are attended in the following order:
(1) Connections on failed routes that can be rerouted to working preferred routes.
(2) Connections on failed routes that can be rerouted to automatically determined alternate routes.
(3) Connections on working current routes that can be rerouted to working preferred routes.

Each time primitive routine 400 is called, it searches table RRT_CON in the transaction handler ("TRNS") of PCC 120 for connections whose status indicates the need for rerouting as shown in step 402. The resulting list is then examined in step 404 to determine if any of the failing connections can be rerouted on a preferred route. If yes, then step 406 calls routine get_pref_conns listing the qualifying failed connections (FAILED_CONNS). Upon completion, the call is terminated at step 420, END.

If no qualifying failed connections are found in step 404, the connections found in step 402 are examined to determine if any of the failed connections may be rerouted on alternate routes. If yes, them step 410 is invoked calling routine get_alt_conns together with the listing of qualifying connections, (FAILED_CONNS). Upon completion, the call ends at step 420.

If the test of step 408 fails, that indicates that any remaining connections are working connections requiring rerouting to preferred routes. If such connections are found to exist at step 412, step 414 invokes routine get_pref_conns (WORKING_CONNS), the same routine as used in step 406 except for the parameters specifying current working (vs failed) routes. Upon completion, or upon failure of test 412, the call ends at step 420.

The preferred embodiment automatically determines alternate routes for connections requiring rerouting of failed routes. Routine get_alt_conns in step 410 looks for a set of connections as well as a route for the connections. Routine get_pref_conns used in steps 410 and 414, only looks for a set of connections using user prespecified preferred routes that have prevalidated queuing delays.

FIG. 8 is a flow chart of the get_alt_conns routine used in step 410 rerouting. By calling routine get_cand_ccts in step 502, a set of candidate connections are fetched from the LCON table of the PCC transaction handler, TRNS, that have the following attributes:

a) connections that allow for alternate routing;
b) connections for which this node is master; and
c) connections that reside on failed routes.

Next, the selected connections are sorted in step 504 according to their loading by routine sort_cards.

Loading is a statistical measure of the actual average bandwidth utilized measure in cells/second. FIG. 9 is a table showing the utilization factor and load for various connections on 64 Kbps DS0 channel having a full load capacity of 381 cells/second, wherein a cell is again assumed to be a 24 byte cell.

After the network loading information has been updated in step 506 of FIG. 8 by routine init_rr_open_space, the candidate connections are sorted in descending order as measured by the load of each of the N candidates.

Step 507 checks the loop count of 1 to N for index cond_cons, corresponding to the N candidates of the preceding step 506, to see if all N candidates have been processed. If so, the routine ends at step 530. Otherwise the candidate connection is passed on to test step 508 which asks if the present candidate has the same attributes (i.e., load type, load units and delay) as the previous candidate. If yes, it proceeds to test step 509, which asks if this candidate's slave is the same as the previous candidate's slave. If yes, the index cond_cons is incremented in step 520 and the loop check 507 is invoked. In this way, if a route exists, unnecessary processing is avoided.

If a negative response obtains from either test step 508 or 509, a connection has been found which is suitable for routing. Routine calc_rrt_path in step 510 then calls routine find_conn_path to select the best route between the connection points, i.e., master and slave nodes. The best route selection is based on the following criteria:

1) select the route with the smallest hop count between the master and slave nodes; and
2) if two routes have the same hop count, select the route with the maximum available bandwidth.

Upon completion of step 510, a best route table results, containing an entry for each node in the network. Each entry specifies the hop count and the identifier of the trunk back to the master.

By way of example, consider the network shown in FIG. 10a for which it is required to reroute a connection from master node 610 (A) to slave node 650 (D), assuming each trunk 612, 623, 624, 635 and 645 is in service with respective available bandwidths of 500, 300, 100, 500, and 500 cells/second.

Upon kick-off, perhaps caused by a failed path 615 shown as a dotted line between node A and D, the PCC state machine Cm_Rrt at node A will follow the above series of routine calls until find_conn_path, step 510 of FIG. 8, gets called and results are validated for all available routes form node A to node D.

The best route table shown in FIG. 10b results from step 512 and applies to node A PCC for output slot 12 of node A. The first column lists the nodes beginning with node A. The second column indicates the number of hops between node A and the slave node listed in the first column. The third column shows the slot number to which slot 12 of node A is connected by means of the best alternate route available using the two step criteria previously stated. Thus, the best route from slot 12 of node A to C is A-B-C, terminating at slot 12 of node C rather than A-B-E-D-C terminating at slot 13 of node C. In this case, the first criterion (i.e., smallest hop count) is sufficient and hence the second criterion (i.e., maximum available bandwidth) need not be considered. Similarly, the best route from node A to D, is by implication, A-B-C-D terminating at slot 15 because although both routes have 3 hops, A-B-C-D has an aggregate available bandwidth of 300 vs 100 cells/second for A-B-E-D.

Test step 512 of FIG. 8 checks the validity of each route derived from the previous step by calling the routines will_ln_carry_con and is_path_delay_ok. The first checks that the additional bandwidth required by the connection can be allocated on the route. The second routine checks the queueing delay on the route, as described below.

FIG. 11 is a flow chart of routine is_path_delay_ok 700 used to implement step 512 of FIG. 8. Step 702 of FIG. 11 checks connection load type for screening only connections routed through the HSD and voice queues. Steps 704 and 706 set up a "for" loop for summing (accumulating) the individual node delays along a given route, as stored by routine 510, find_conn_path, when building the best route table.

For example, the best route table of FIG. 10b starts by filling the entry for node B, the only network with one hop route to A. The delay on route A-B is calculated by checking the delay on line 13 of node B which is determined by the HSD queue size and the attributes for the voice queue in cell line 13 at node B. This topological information is stored in the node information block (NIB) data base for node B in PCC 120 of node A and made available for copying and storing by routine 510, find_con_path. After all one hop routes from node A are exhausted, two hop routes are considered. For example, the delay on path A-B-C can be calculated by adding the delay on line 12 at node C to the stored delay for path A-B. Similarly, the other two hop path A-B-E may be calculated, exhausting all 2 hop paths, and so on.

Returning to FIG. 11, the chain of tests 708, 712, 716, 720 and 724 are for purposes of sorting out the type of connection under consideration as shown in table of FIG. 12. Tests 710, 714, 718, 722, and 726 determine if the subject route is less than or greater than the maximum delay allowed for each class of connection. If less than the maximum delay allowed, the route is validated by step 730 by returning a TRUE indication to step 512 of FIG. 8. Otherwise, a FALSE indication is returned to step 512 by step 740. In either case, routine 700 is exited with the END step 750.

If routine is_path_delay_ok 700 returns FALSE to step 512 of FIG. 8, the process advances to step 518, wherein the slave node is marked to indicate no valid route was found for a connection of this magnitude load. This is done in order to avoid unnecessary processing if another connection of comparable or greater load is encountered. If routine 700 returns TRUE to step 512, the process advances to step 514 in which all of the connections that can be fit on a given route are packed together using routine pack_conns. In the following step 516, the route is saved for either use or additional packing of connections. In either case, the loop index cond_cons is incremented in step 520 and passed on to step 507, wherein the index is checked against the limit, N.

It should be noted that the validation method of FIG. 11 is not limited to rerouting of failed connections but is also applicable to the initial validation of preferred routes and also to the validation of upgraded or downgraded working voice connections.

The calculation of actual user configurable connection delay is not used only to validate routes for a given class of service. It is also used to program an adequate minimum delay in the destination PAD, i.e., VDPROC 156 or SDP 134 of the destination node, as shown in FIG. 2. Specifically, the null time delay (NTD), the delay that is programmed in VDPROC 156 or SDP 134, is defined as the minimum of the maximum delay programmable on the PAD and the total queuing delay on the route.

The methods, previously defined for routing and calculating network delay have the additional beneficial result of providing a more accurate reconstruction of voice data.

In order to understand the beneficial use of the NTD by way of example, refer to lines (a) through (e) of FIG. 13. FIG. 13 line (a) symbolically depicts contiguous segments of voice data. FIG. 13 line (b) shows the numbered segments of FIG. 13 line (a) in corresponding numbered cells, compressed in time.

FIG. 13 line (c) shows these same cells as received in time at the destination PAD. Note that the arrival times are not necessarily uniformly spaced because of the various unpredictable queuing delays encountered enroute (as previously discussed). By way of this example, let it be assumed that cells 1 and 3 experience minimum delays, cells 2 and 4 maximum delays, and cell 5 an intermediate value of delay. Further, assuming that the maximum delays of cells 2 and 4 are less than the maximum delay of the appropriate PAD, these two delays correspond to the NTD value previously defined.

FIG. 13 line (d) shows the reassembled voice segments. Note the gap occurring between reassembled segment 1 and segment 2 that results from the delay of cell 2. In other words, upon reconstructing voice segment 1, cell 2 is not available for constructing a continuous flow of voice data, an undesirable voice reconstruction.

FIG. 13 line (c) shows the results of programming a delay in the PAD corresponding to the NTD value before reassembling cell 1. Upon reconstruction of segment 1, cell 2 and subsequent cells are available for timely reassembling so as to form a continuous periodic stream of sampled PCM voice data.

Routine pack_conns of step 514 of FIG. 8 includes the NTD checking for each packed connection.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. In a cell switching network having a multiplicity of nodes, a method of rerouting connections, each connection connecting a master node and a slave node, the master node and the slave node each being a one of the multiplicity of nodes, each connection having an associated loading and being a type of a multiplicity of types of connections accommodated by the cell switching network, the method comprising the steps of:

a) identifying connections needing to be rerouted;

b) ordering the connections needing to be rerouted according to their associated loading;

c) selecting a selected connection from the connections needing to be rerouted and that have been ordered, the selected connection connecting a selected master node and a selected slave node; and d) rerouting the selected connection by:

1) selecting candidate routes from among working routes connecting the selected master node and the selected slave node, each candidate route having the smallest route delay in terms of a total node delay between the selected master node and the selected slave node as compared to route delays of other working routes between the selected master node and selected slave node, each candidate route having a bandwidth;

2) validating true each candidate route if the route delay of the candidate route is within a user configurable prescribed limit for the type of the selected connection and if the bandwidth of the candidate route is sufficient to accommodate the selected connection;

3) rerouting the selected connection via a one of the candidate routes that have been validated true; and 4) updating a validated route description table in the selected master node to reflect packing of the candidate route by which the selected connection has been rerouted, the validated route table including the route delay, bandwidth, and packing of each candidate route.

2. The method of claim 1 wherein the step of selecting candidate routes further comprises selecting from the candidate routes a candidate route having the greatest bandwidth.

3. The method of claim 1, further comprising the steps of:

a) validating false each candidate route which has a route delay greater than the user configurable prescribed limit; and b) validating false each candidate route which has bandwidth insufficient to accommodate the selected connection.

4. The method of claim 1 further comprising the step of:

a) if all connections needing rerouting have not been rerouted selecting another connection needing rerouting as the selected connection, the selected connection having the same route delay and the same bandwidth as the immediately previous selected connection.

5. The method of claim 1, wherein the step of validating true each candidate route comprises:

a) summing node delays for all nodes between the selected master node and the selected slave node along the candidate route to determine the route delay for the candidate route;

b) comparing the route delay of the candidate route to the user configurable prescribed limit for the connection type of the selected connection; and c) validating true the candidate route if the user configurable prescribed limit for the connection type of the selected connection is not exceeded by the route delay of the candidate route.

6. The method of claim 5 wherein each node in the cell switching network includes a queue for each connection type accommodated by the cell switching network, each queue having a queue length and wherein the method further comprises:

a) adjusting a node delay of a node within the cell switching network by adjusting a queue length of a queue; and b) broadcasting the queue length that has been adjusted to all other nodes in the cell switching network.

7. The method of claim 6, further comprising the steps of:

a) updating the validated route description table in each node automatically when a queue length is broadcast;

b) for each selected connection, broadcasting the candidate route by which the selected connection has been routed to all nodes in the cell switching network; and c) updating the validated route description table in each node when the selected master node broadcasts the candidate route by which the selected connection has been rerouted.

* * * * *